United States Patent [19]

Jones

[11] Patent Number: 5,497,904
[45] Date of Patent: Mar. 12, 1996

[54] GUM LABEL DISPENSER

[76] Inventor: Gerald T. Jones, 411 Ocala Dr., Apt. #3, Knoxville, Tenn. 37918

[21] Appl. No.: 350,455

[22] Filed: Dec. 7, 1994

[51] Int. Cl.⁶ .................................. A01C 15/04
[52] U.S. Cl. .......................... 221/185; 224/269
[58] Field of Search .................... 221/70, 73, 185, 221/259; 224/269, 268

[56] References Cited

U.S. PATENT DOCUMENTS 3,509,000  4/1970  Brown ........................... 221/73
5,358,158  10/1994  Darr ............................. 224/269

Primary Examiner—Kenneth Noland

[57] ABSTRACT

A roll of gum label comprising a base plate having a first side, a second side, an upper extent and a lower extent, and a major aperture formed through the base plate intermediate the upper and lower extents. A U-shaped resilient clip has a closed upper end, an open lower end, a first leg and a second leg, with the second leg of the clip coupled to the first side of the base plate. An axle has a hollow threaded interior, first end, a second end and a cylindrical surface therebetween. The first end of the axle is adapted for registration with the major aperture of the base plate.

5 Claims, 4 Drawing Sheets

GUM LABEL DISPENSER

BACKGROUND OF THE INVENTION

1. Field of the Invention

The present invention relates to a gum label dispenser and more particularly pertains to a portable gum label dispenser.

2. Description of the Prior Art

The use of dispensers is known in the prior art. More specifically, dispensers heretofore devised and utilized for the purpose of dispensing rolls of material are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 3,698,600 to Foote discloses a label dispenser.

U.S. Pat. No. 5,209,374 to Seidl-Lichthardt discloses a label dispenser for self-adhesive labels.

U.S. Pat. No. 3,459,623 to Koenitzer discloses a clip-on label dispenser.

U.S. Pat. No. Des. 317,984 to Reynoso et al. discloses a belt mountable tape dispenser.

Lastly, U.S. Pat. No. 3,447,992 to Allen et al. discloses a label dispenser.

In this respect, the gum label dispenser according to the present invention substantially departs from the conventional concepts and designs of the prior art, and in doing so provides an apparatus primarily developed for the purpose of providing a portable gum label dispenser.

Therefore, it can be appreciated that there exists a continuing need for a new and improved gum label dispenser which can be used for a portably dispensing gum labels. In this regard, the present invention substantially fulfills this need.

SUMMARY OF THE INVENTION

In view of the foregoing disadvantages inherent in the known types of dispensers now present in the prior art, the present invention provides an improved gum label dispenser. As such, the general purpose of the present invention, which will be described subsequently in greater detail, is to provide a new and improved gum label dispenser and method which has all the advantages of the prior art and none of the disadvantages.

To attain this, the present invention essentially comprises a new and improved portable waist mounted dispenser adapted to carry a roll of gum label. In its broadest context the present invention includes a base plate, a roller assembly, an end ring, and a belt clip. Polyvinyl chloride is the preferred material for many of the components; however, other plastics can substituted.

The rectangular base plate is constructed from polyvinyl chloride and has a first side, a second side, an upper extent and a lower extent. Two minor apertures are formed through the upper extent, and a major aperture is formed through the base plate intermediate the upper and lower extents. The function of these apertures will be described in greater detail hereinafter.

The belt clip is constructed from a U-shaped resilient clip having a closed upper end, an open lower end, a fist leg and a second leg. The second leg can be secured to the base plate in any one of a number of ways common in the art. However, in the preferred embodiment, two minor apertures are formed through the second leg of the clip. The two minor apertures of the U-shaped resilient clip are adapted for registration with the two minor apertures of the rectangular base. Two retaining elements are positioned within the two minor apertures of the U-shaped clip and the two minor apertures of the base plate. The two retaining elements function to secure the U-shaped clip to the base plate and can take the form of bolts, nuts, screws, rivets or other such fasteners.

The roller assembly includes both an axle and a roller. The axle is constructed from polyvinyl chloride. The axle has a hollow threaded interior, first end, a second end and a cylindrical surface therebetween. The first end of the axle is adapted for registration with the major aperture of the base plate, and a first screw is secured within the major aperture of the base plate and threadably received within the first end of the axle. This first screw can be readily be replaced with any one of a number of fasteners performing the same function. The first screw functions to couple the axle to the base plate.

The axle assembly also includes a hollow roller. The roller is constructed from polyvinyl chloride. The roller has a first end, a second end, and a cylindrical surface therebetween. The roller is positioned over the axle with the cylindrical surface of the roller adapted to rotatably carry a roll of gum label. However, the roller, and the dispenser in general, can carry other strip materials in a cylindrical form. For example, tape, fabric, adhesives, and paper materials can all be carried on the roller.

A second screw is inserted through the second end of the hollow roller and is threadably received within the second end of the axle. As with the first screw, the second screw can readily be replaced with any fastener performing the same function. The function of the second screw is to couple the axle and the roller.

Any one of a plurality of end rings can be inserted over the roller. Each of the end rings are constructed from polyvinyl chloride and have an inside diameter and an outside diameter. The end rings all have an inside diameter which allows it to be inserted over the cylindrical surface of the hollow roller, and various outside diameters. The end rings function as an end cap for any one of a number of gum label rolls. Any one of the end rings can be positioned over the hollow roller.

At the end of the axle assembly is positioned an end cap. The end cap is formed from a resilient material and is frustroconical in shape. The end cap has an opened first end and a closed end. The opened first end is secured over the second end of the roller.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent of legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved gum label dispenser which has all the advantages of the prior art dispensers and none of the disadvantages.

It is another object of the present invention to provide a new and improved gum label dispenser which may be easily and efficiently manufactured and marketed.

It is a further object of the present invention to provide a new and improved gum label dispenser which is of durable and reliable constructions.

An even further object of the present invention is to provide a new and improved gum label dispenser which is susceptible of a low cost of manufacture with regard to both materials and labor, and which accordingly is then susceptible of low prices of sale to the consuming public, thereby making such gum label dispenser economically available to the buying public.

Still yet another object of the present invention is to provide a new and improved gum label dispenser which provides in the apparatuses and methods of the prior art some of the advantages thereof, while simultaneously overcoming some of the disadvantages normally associated therewith.

Even still another object of the present invention is to provide a portable gum label dispenser.

Lastly, it is an object of the present invention to provide a new and improved portable waist mounted dispenser adapted to carry a roll of gum label comprising a base plate having a first side, a second side, an upper extent and a lower extent. A major aperture is formed through the base plate intermediate the upper and lower extents. A U-shaped resilient clip has a closed upper end, an open lower end, a first leg and a second leg, with the second leg of the clip coupled to the first side of the base plate. An axle has a hollow threaded interior, first end, a second end and a cylindrical surface therebetween. The first end of the axle is adapted for registration with the major aperture of the base plate. A first screw is secured within the major aperture of the base plate and threadably received within the first end of the axle, the first screw functioning to couple the axle to the base plate. A hollow roller has a first end, a second end, and a cylindrical surface therebetween, the roller positioned over the axle, the cylindrical surface of the roller adapted to rotatably carry a roll of gum label. A second screw is inserted through the second end of the hollow roller and threadably received within the second end of the axle, the second screw functioning to couple the axle and the roller. An end ring has an inside diameter and an outside diameter, the inside diameter being such as to allow the ring to be inserted over the cylindrical surface of the hollow roller, the end ring functioning as an end cap for the gum label roll. A resilient frustroconical end cap is also provided, the end cap having a opened first end and a closed second end, the opened first end secured over the second end of the roller.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
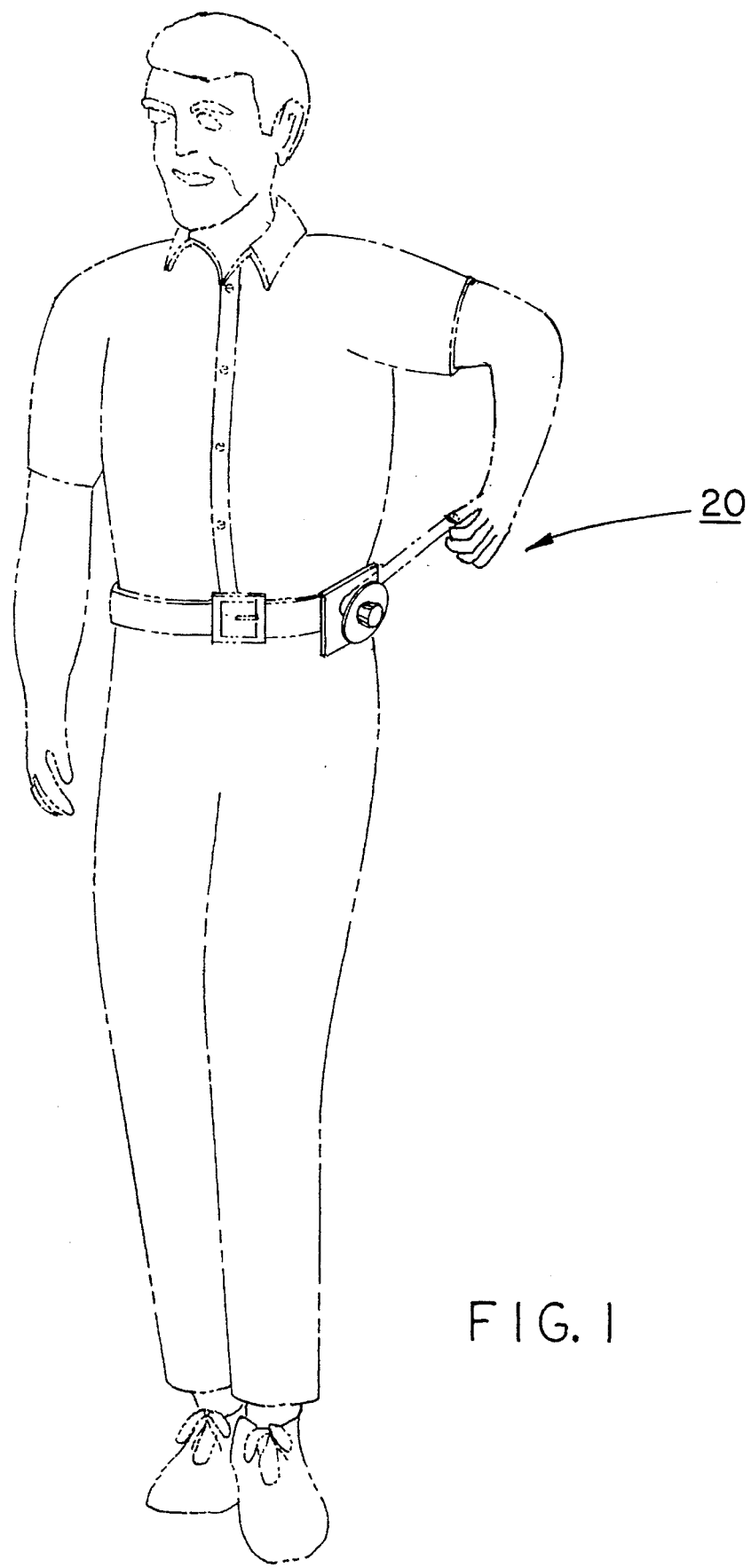
FIG. 1 is a perspective view of the preferred embodiment of the gum label dispenser constructed in accordance with the principles of the present invention.
Figure 2:
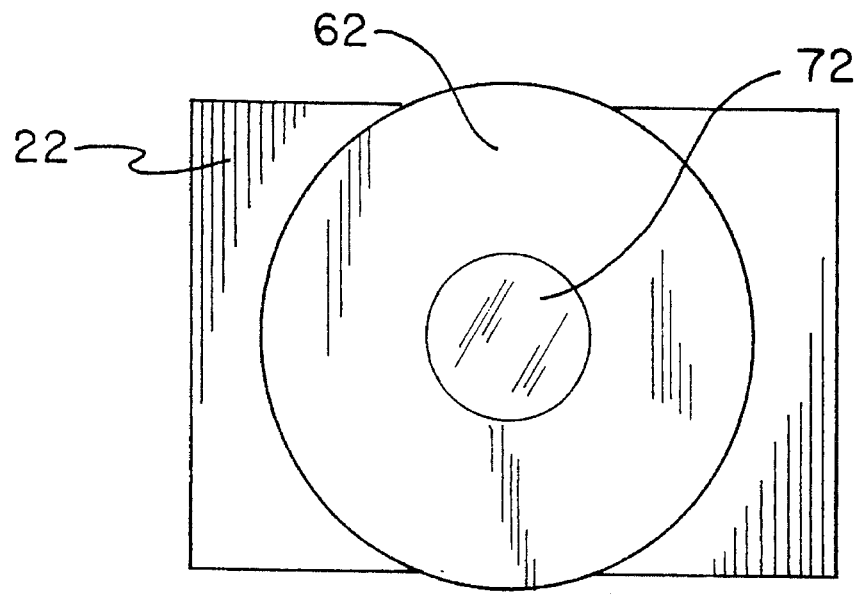
FIG. 2 is a front elevational view of the tape dispenser of the present invention.
Figure 3:
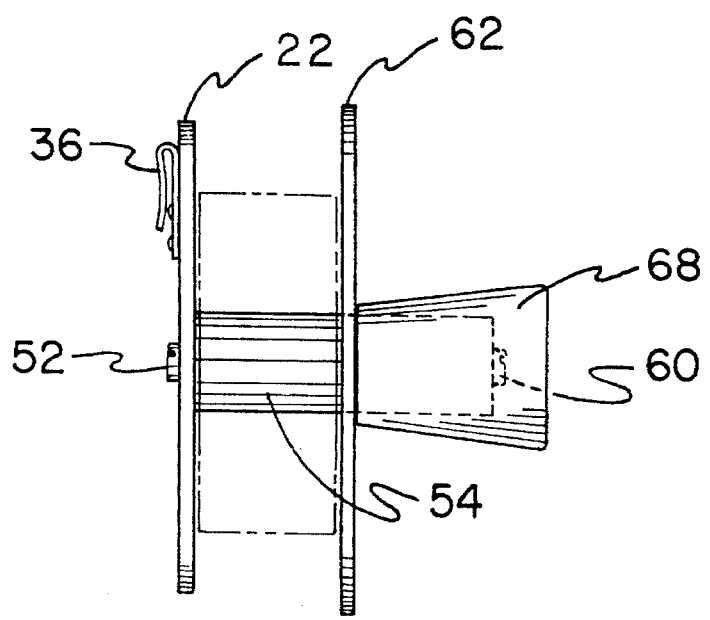
FIG. 3 is a side elevational view of the dispenser of the present invention.
Figure 4:
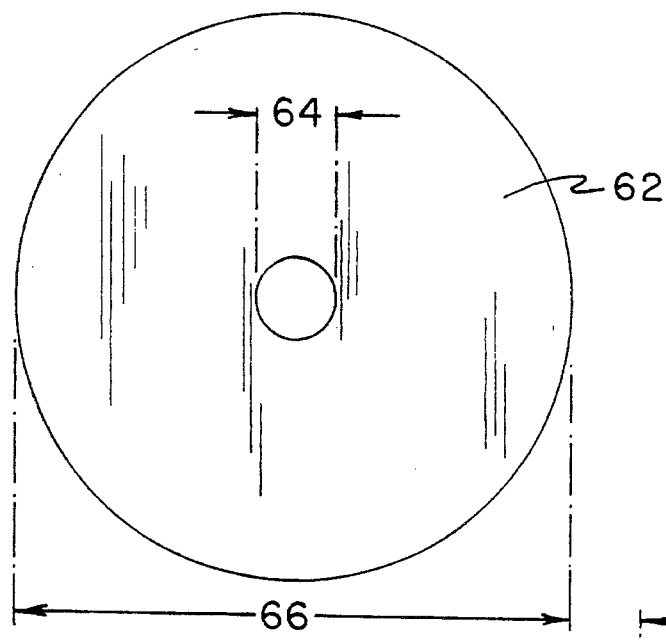
FIG. 4 is a view of one of the end rings in accordance with the present invention.
Figure 5:
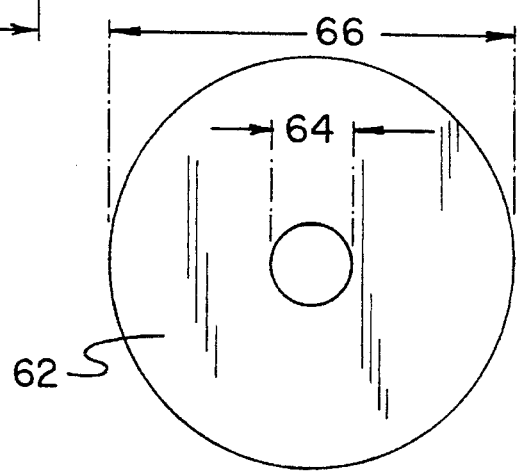
FIG. 5 is a view of another one of the end rings in accordance with the present invention.
Figure 6:
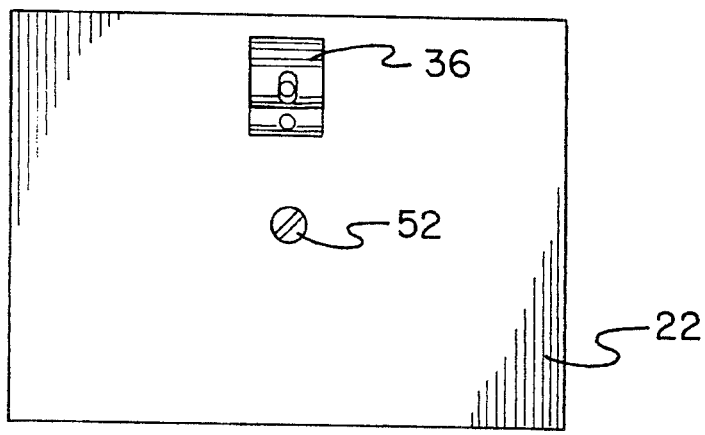
FIG. 6 is a back elevational view of the dispenser of the present invention.
Figure 7:
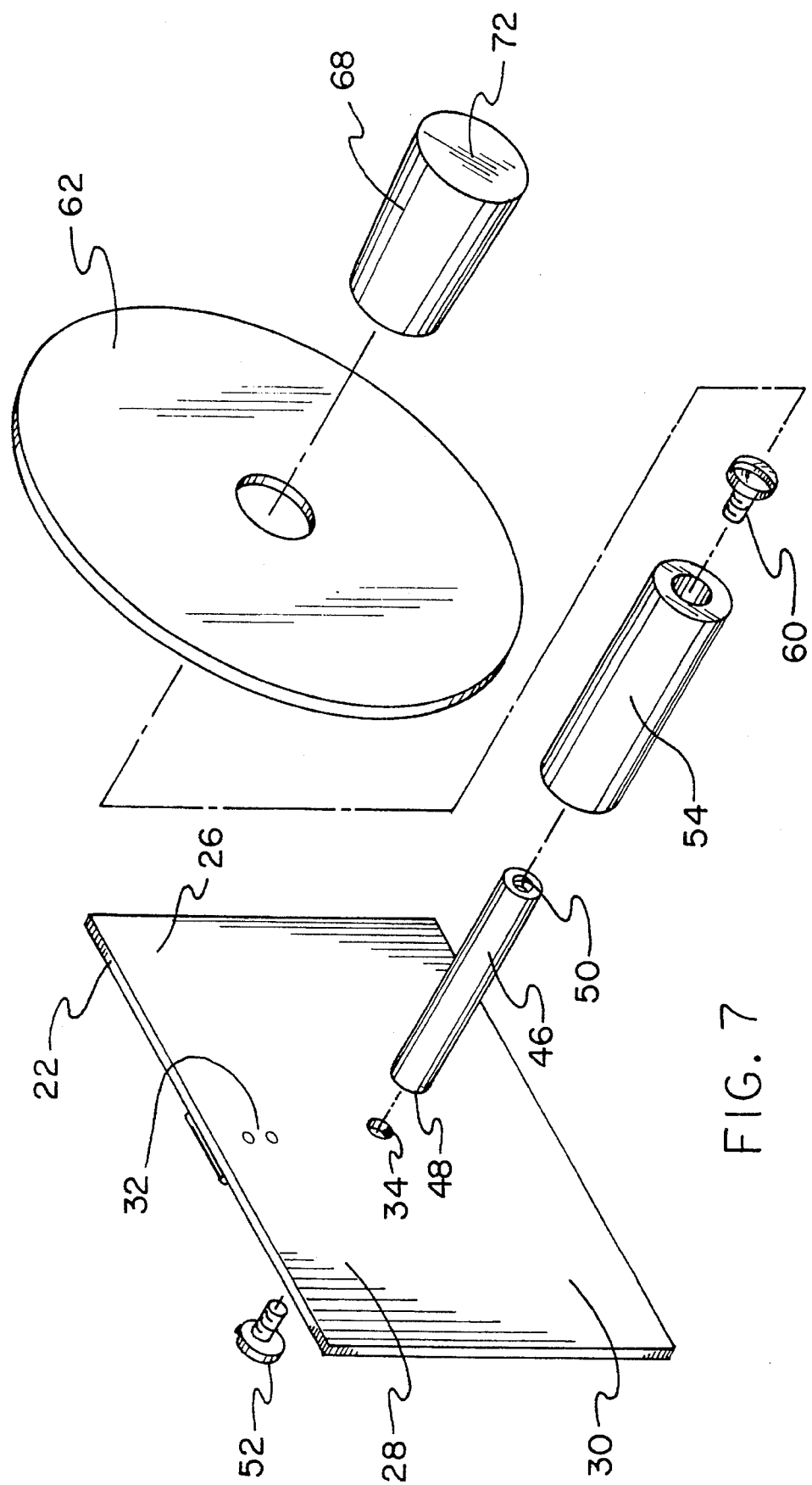
FIG. 7 is an exploded view of the dispenser in accordance with the present invention.

With reference now to the drawings, and in particular to FIG. 1 thereof, the preferred embodiment of the new and improved gum label dispenser embodying the principles and concepts of the present invention and generally designated by the reference numeral 10 will be described.

More specifically, it will be noted in the various Figures that the present invention relates to a new and improved portable waist mounted dispenser 20 adapted to carry a roll of gum label. In its broadest context the present invention includes a base plate 22, a roller assembly, an end ring 62, and a belt clip 36. Polyvinyl chloride is the preferred material for many of the components; however, other plastics can be substituted.

The rectangular base plate 22 is constructed from polyvinyl chloride and has a first side 24, a second side 26, an upper extent 28 and a lower extent 30. Two minor apertures 32 are formed through the upper extent, and a major aperture 34 is formed through the base plate 22 intermediate the upper and lower extents. The function of these apertures will be described in greater detail hereinafter.

The belt clip 36 is constructed from a U-shaped resilient clip 36 having a closed upper end 38, an open lower end 40, a first leg 42 and a second leg 44. The second leg 44 can be secured to the base plate 22 in any one of a number of ways common in the art. However, in the preferred embodiment, two minor apertures 32 are formed through the second leg 44 of the clip 36. The two minor apertures 32 of the U-shaped resilient clip 36 are adapted for registration with the two minor apertures 32 of the rectangular base. Two retaining elements are positioned within the two minor apertures 32 of the U-shaped clip 36 and the two minor apertures 32 of the base plate 22. The two retaining elements function to secure the U-shaped clip 36 to the base plate 22 and can take of form of bolts, nuts, screws, rivets or other such fasteners.

The roller assembly includes both an axle 46 and a roller 54. The axle 46 is constructed from polyvinyl chloride. The axle 46 has a hollow threaded interior, first end 48, a second end 50 and a cylindrical surface therebetween. The first end 48 of the axle 46 is adapted for registration with the major aperture 34 of the base plate 22, and a first screw 52 is secured within the major aperture 34 of the base plate 22 and threadably received within the first end 48 of the axle 46. This first screw 52 can be readily be replaced with any one of a number of fasteners performing the same function. The first screw 52 functions to couple the axle 46 to the base plate 22.

The axle 46 assembly also includes a hollow roller 54. The roller 54 is constructed from polyvinyl chloride. The roller 54 has a first end 56, a second end 50, and a cylindrical surface therebetween. The roller 54 is positioned over the axle 46 with the cylindrical surface of the roller 54 adapted to rotatably carry a roll of gum label. However, the roller 54, and the dispenser 20 in general, can carry other strip materials in a cylindrical form. For example, tape, fabric, adhesives, and paper materials can all be carried on the roller 54. A second screw 60 is inserted through the second end 58 of the hollow roller 54 and is threadably received within the second end 50 of the axle 46. As with the first screw 52, the second screw 60 can readily be replaced with any fastener performing the same function. The function of the second screw 60 is to couple the axle 46 and the roller 54.

Any one of a plurality of end rings 62 can be inserted over the roller 54. Each of the end rings 62 are constructed from polyvinyl chloride and have a inside diameter 64 and an outside diameter 66. The end rings 62 all have an inside diameter 64 which allows it to be inserted over the cylindrical surface of the hollow roller 54, and various outside diameters 66. The end rings 62 function as an end cap 68 for any one of a number of gum label rolls. Any one of the end rings 62 can be positioned over the hollow roller 54.

At the end of the axle 46 assembly is positioned an end cap 68. The end cap 68 is formed from a resilient material and is frustroconical in shape. The end cap 68 has an opened first end 70 and a closed end 72. The opened first end 70 is secured over the second end 58 of the roller 54.

Therefore, the present invention relates to a portable gum label dispenser which is designed to conveniently carry and dispense the gummed labels used for merchandise by industrial distribution centers. It is simply comprised of a belt clip, two end plates, a spindle assembly, and an end cap with associated hardware. The clip broadly resembles a money clip and is attached at the top of the end plate which rests against the body of the carrier. This plate is rectangular and measures five by seven inches.

The second end plate can be provided in two sizes to accommodate the variously sized rolls on which the labels are supplied, and these plates are interchangeable. One is five inches in diameter while the second has a diameter of seven inches. All three plates are one eighth of an inch in thickness and made of material similar to that used for PVC piping. The end plates straddle a steel pin and plastic roller which has a one inch outside diameter; both of these components are three and one quarter inches in length. Finally, the end cap is a tapered rubber boot which fits snugly over the plastic roller.

One can quickly mount a roll of labels and use the appropriate end plate to retain it in place. It is then a simple matter to place the clip over a belt and carry the roll along as one works. This leaves both hands free to apply labels to merchandise such as shoes, dresses, clothing and other miscellaneous articles. The process of applying the labels will be greatly accelerated since one does not have to manipulate the roll separately. This will represent a significant savings to any business of this nature since these labels are now applied in greater volume.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved portable waist mounted dispenser adapted to carry a roll of gum label comprising, in combination:

a rectangular base plate constructed from polyvinyl chloride, the base plate having a first side, a second side, an upper extent and a lower extent, two minor apertures formed through the upper extent, a major aperture formed through the base plate intermediate the upper and lower extents;

a U-shaped resilient clip having a closed upper end, an open lower end, a first leg and a second leg, two minor apertures formed through the second leg, the two minor apertures of the U-shaped resilient clip adapted for registration with the two minor apertures of the rectangular base, two retaining elements positioned within the two minor apertures of the U-shaped clip and the two minor apertures of the base plate, the two retaining elements functioning to secure the U-shaped clip to the base plate;

an axle constructed from polyvinyl chloride, the axle having a hollow threaded interior, first end, a second end and a cylindrical surface therebetween, the first end of the axle adapted for registration with the major aperture of the base plate, a first screw secured within the major aperture of the base plate and threadably received within the first end of the axle, the first screw functioning to couple the axle to the base plate;

a hollow roller constructed from polyvinyl chloride, the roller having a first end, a second end, and a cylindrical surface therebetween, the roller positioned over the axle, the cylindrical surface of the roller adapted to rotatably carry a roll of gum label, a second screw inserted through the second end of the hollow roller and threadably received within the second end of the axle, the second screw functioning to couple the axle and the roller;

a plurality of end rings, each of the end rings constructed from polyvinyl chloride and having an inside diameter and an outside diameter, each of the end rings having an inside diameter which allows it to be inserted over the cylindrical surface of the hollow roller, each of the end rings having a different outside diameter, the end rings functioning as an end cap for any one of a number of gum label rolls, one of the end rings positioned over the hollow roller; and a resilient frustroconical end cap, the end cap having a opened first end and a closed second end, the opened first end secured over the second end of the roller.

2. A new and improved portable waist mounted dispenser adapted to carry a roll of gum label comprising:

a base plate having a first side, a second side, an upper extent and a lower extent, a major aperture formed through the base plate intermediate the upper and lower extents;

a U-shaped resilient clip having a closed upper end, an open lower end, a first leg and a second leg, the second leg of the clip coupled to the first side of the base plate;

an axle having a hollow threaded interior, first end, a second end and a cylindrical surface therebetween, the first end of the axle adapted for registration with the major aperture of the base plate, a first screw secured within the major aperture of the base plate and threadably received within the first end of the axle, the first screw functioning to couple the axle to the base plate;

a hollow roller having a first end, a second end, and a cylindrical surface therebetween, the roller positioned over the axle, the cylindrical surface of the roller adapted to rotatably carry a roll of gum label, a second screw inserted through the second end of the hollow roller and threadably received within the second end of the axle, the second screw functioning to couple the axle and the roller;

an end ring having an inside diameter and an outside diameter, the inside diameter being such as to allow the ring to be inserted over the cylindrical surface of the hollow roller, the end ring functioning as an end cap for the gum label roll; and a resilient frustroconical end cap, the end cap having an opened first end and a closed second end, the opened first end secured over the second end of the roller.

3. The dispenser as described in claim 2 wherein:

the base plate, the axle, the roller and the end ring are all constructed from polyvinyl chloride.

4. The dispenser as described in claim 2 wherein: the end cap is frustroconical in shape and formed from a resilient material.

5. The dispenser as described in claim 2 wherein:

the end ring is replaced by any one of a plurality of end rings of various outside diameters.

* * * * *